United States Patent [19]

Iijima et al.

[11] 4,407,446

[45] Oct. 4, 1983

[54] CONTROL FOR AUTOMOBILE AIR CONDITIONING SYSTEM

[75] Inventors: Tetsuya Iijima, Yamato; Seiichi Takahashi, Tokyo, both of Japan

[73] Assignee: Nissan Motor Co., Ltd., Yokohama, Japan

[21] Appl. No.: 317,862

[22] Filed: Nov. 3, 1981

[30] Foreign Application Priority Data

Nov. 4, 1980 [JP] Japan ................................ 55-153720

[51] Int. Cl.³ ........................... F24F 7/00; B60H 3/00
[52] U.S. Cl. ............................... 236/49; 236/DIG. 9; 165/16; 165/42
[58] Field of Search ..................... 236/49, 38, DIG. 9; 165/40, 16, 41, 42, 43; 62/186

[56] References Cited

U.S. PATENT DOCUMENTS

| | | |
|---|---|---|
| 3,263,739 | 8/1966 | Gaskill et al. . |
| 3,505,828 | 4/1970 | Vander Molen et al. . |
| 3,517,523 | 6/1970 | Brown et al. ................ 62/226 X |
| 3,656,541 | 4/1972 | Coyle et al. . |
| 3,763,927 | 10/1973 | Stafford et al. .................. 165/42 |
| 3,990,505 | 11/1976 | Davenport . |
| 4,143,706 | 3/1979 | Schnaibel et al. ............... 165/43 |
| 4,147,205 | 4/1979 | Bata et al. . |
| 4,311,188 | 1/1982 | Kojima et al. ................... 165/43 |

*Primary Examiner*—Albert J. Makay
*Assistant Examiner*—Harry Tanner
*Attorney, Agent, or Firm*—Lowe, King, Price & Becker

[57] ABSTRACT

An automobile air conditioning system is provided with a control system for controlling the flow rate of hot or cool air discharged into the passenger compartment. In this control system, the air flow rate is increased with an increase of the absolute value of the temperature difference between a predetermined reference temperature and a room temperature of the compartment detected by a sensor, and is decreased with a decrease of the absolute value.

11 Claims, 6 Drawing Figures

CONTROL FOR AUTOMOBILE AIR CONDITIONING SYSTEM

BACKGROUND OF THE INVENTION

The present invention relates to an air quantity control system and method for an automobile air conditioning system for controlling the quantity of warm or cool air discharged from the air conditioning system.

Recent air conditioning systems are provided with various control systems to efficiently provide a more comfortable environment for the occupants. The quantity of discharged air is one of controlled variables in such control systems.

SUMMARY OF THE INVENTION

It is an object of the present invention to provide an air quantity control system and method of an automobile air conditioning system which is arranged to provide precise and smooth control performance.

According to the present invention, first a reference temperature is determined, and the temperature of the passenger compartment is sensed by a sensor. Then the speed of a blower fan of the air conditioning system is controlled in such a manner that the fan speed increases with an increase of the absolute value of the temperature difference between the reference temperature and the sensed temperature of the passenger compartment, and decreases with a decrease of the absolute value.

DETAILED DESCRIPTION OF THE INVENTION

Figure 1:
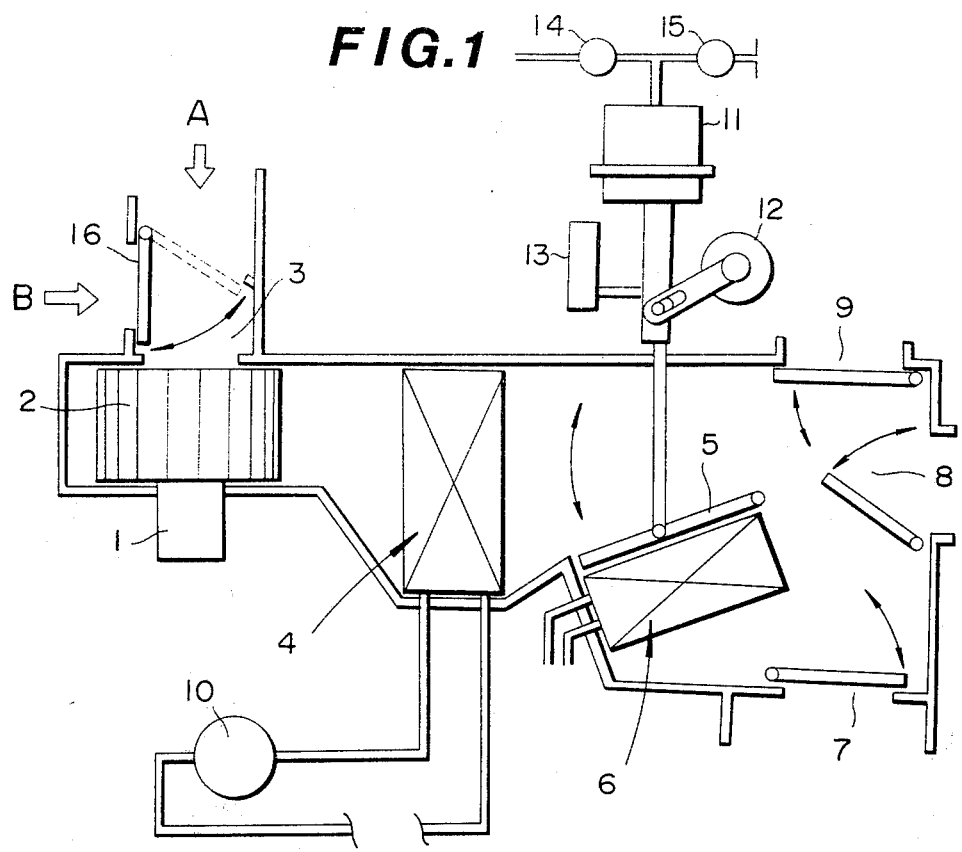
FIG. 1 is a schematic illustration of an air conditioning system.

In FIG. 1, air is drawn in through an air inlet 3 by a blower fan 2 driven by a motor 1, and cooled by a cooling unit 4. After being cooled, a part of the air is introduced into a heating unit 6, and an air mixing door 5 proportions the amount of air permitted to pass through the heating unit 6 in accordance with the opening of door 5. Then, in order to obtain air of a desired temperature, the heated part of the incoming air is mixed again with the remaining part of the incoming air which does not pass through the heating unit. The mixed air is then blown off through a plurality of air outlets 7, 8 and 9 into the passenger compartment. A reference numeral 10 denotes a compressor of the cooling unit 4. The air mixing door 5 is actuated by an actuator 11, which is controlled by a solenoid valve 14 for introducing the intake vacuum into the actuator 11 and a solenoid valve 15 for making fluid communication between the actuator 11 and the atmosphere. There are further provided a sensor 12 for sensing the degree of opening of the air mixing door 5, and a slide switch 13 linked with the air mixing door 5. An air inlet door 16 is provided to select air coming into the air conditioning system. When the air intake door 16 takes the position shown by a solid line in FIG. 1, fresh outside air is allowed to enter the system and refreshes the air in the passenger compartment. When, on the other hand, the air intake door 16 is at the position shown by a broken line, the air inside the compartment is recirculated into the system thereby to provide efficient cooling or heating.

Figure 2:
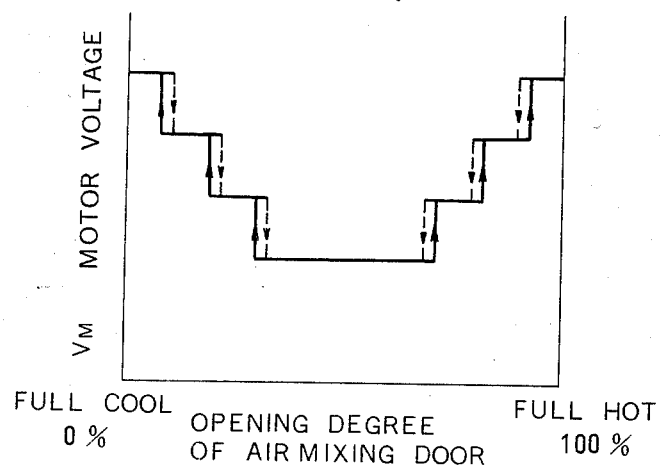
FIG. 2 is a diagram showing an example of characteristics according to a conventional air quantity control system.

In such an automobile air conditioning system, the flow rate of hot or cool air is generally controlled depending on the degree of opening of the air mixing door, as shown in FIG. 2 for example. Under such a control strategy, the quantity of discharged hot or cool air is changed in accordance with the opening degree of the air mixing door, and becomes maximum both in a full hot mode where the air mixing door is fully open and the maximum heating power is developed, and in a full cool mode where the air mixing door is fully closed and the maximum cooling power is developed.

When the ambient temperature is high or low, the air conditioning system of FIG. 2, however, must often continue to run in the full hot mode or the full cool mode for a relatively long time at a starting period in order to supply enough heat match a large temperature gap between a target temperature and an actual temperature. During that time, the blower fan, too, continues to run at the full speed, and therefore, the fan noise becomes very troublesome.

Furthermore, in the control system of FIG. 2, the air temperature and the air flow rate are changed together in accordance with the position of the air mixing door, and on the other hand, the air conditioning power, that is heat supply, is determined by a product of the air temperature and the air flow rate. Therefore, although this system can provide sufficient heating or cooling power at or near the full closed state or the full open state of the air mixing door, a slight position change of the air mixing door brings about a considerable decrease of the air conditioning power of the system. Therefore, especially in the air conditioning system not having enough power, a position change of the air mixing door within a short period of time often causes a lack of the heat supply as compared with a heat load required by the automobile, and this, in turn, urges the air mixing door toward the power increase direction, resulting in repetition of the same cycle, that is undesirable hunting.

In view of the above, reference is now made to FIGS. 3 to 6, wherein an embodiment of the control system and method of the present invention is shown.

Figure 3:
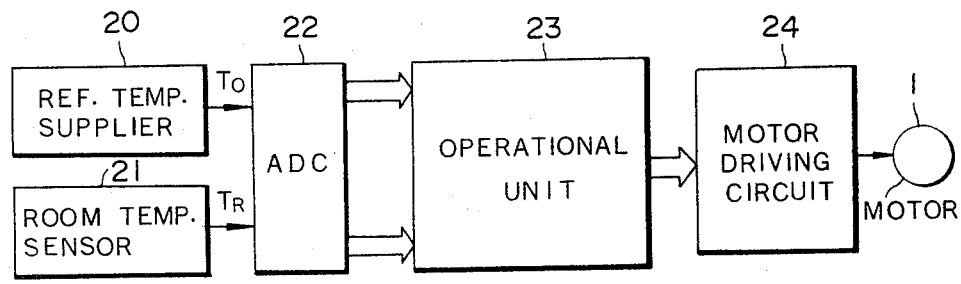
FIG. 3 is a block diagram showing the air quantity control system of the present invention.

In FIG. 3, a reference room temperature supplier 20 generates a reference room temperature signal To, and a room temperature sensor 21 senses the temperature of the passenger compartment room and generates a room temperature signal Tr indicative of a sensed temperature. Both of the signals To and Tr are sent to an analogue to digital converter 22, which changes the input analogue signals into corresponding digital signals. An operational unit 23 receives the output signals of the analogue to digital converter 22, performs an operation in accordance with a prescribed rule (which will be explained hereinafter), and obtains a motor voltage Vm for the blower fan motor 1. A motor driving circuit 24 drives the blower fan motor 1 in accordance with the motor voltage signal Vm sent from the operational unit 23.

Figure 4:
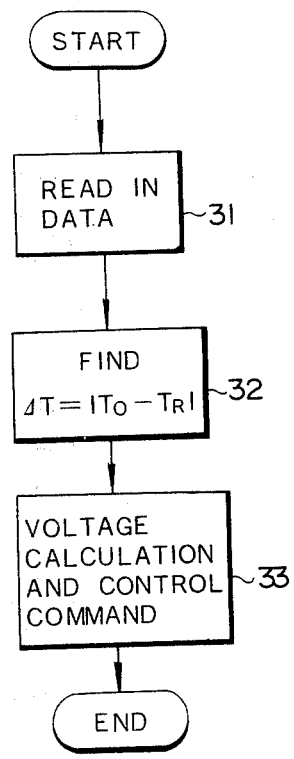
FIGS. 4 and 5 are flowcharts showing the operations of the control system of the present invention.
Figure 5:
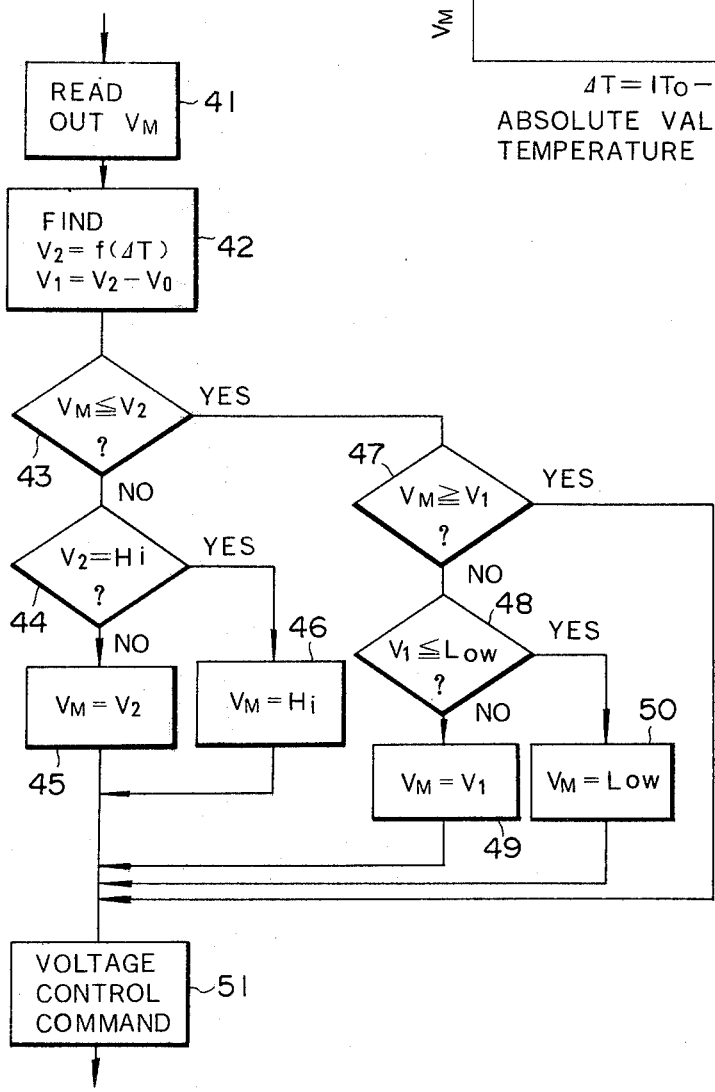

The operations of the control system is explained now with reference to the flow charts of FIGS. 4 and 5.

At a step 31 of FIG. 4, the reference temperature siganl To and the room temperature signal Tr which are converted into a digital form are stored in a memory section of the operational unit 23. Then, the operational unit 23 calculates the absolute value (Delta T) of the temperature difference between To and Tr at a step 32, and at a next step 33, obtains the motor voltage Vm from the absolute value of the temperature difference in accordance with a rule shown by the flowchart of FIG. 5.

Figure 6:
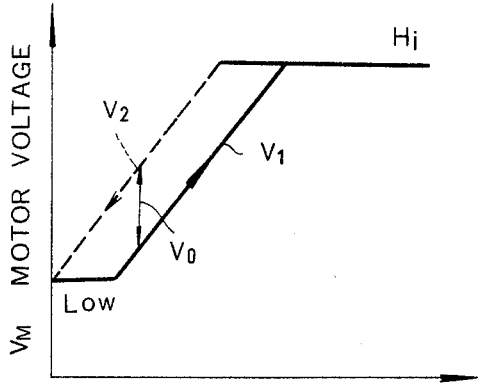
FIG. 6 is a diagram showing characteristic curves of blower fan motor voltage Vm according to the present invention.

As shown in FIG. 6, for example, the characteristic of the blower fan motor voltage Vm is predetermined as a function of the absolute value (Delta T) of the temperature difference between To and Tr. In FIG. 6, Vm is determined according to a lower characteristic curve V1 (a solid line) in the case of an increase of Delta T, and according to an upper characteristic curve V2 (a broken line) in the case of a decrease of Delta T. In this example, both of the characteristic curves are straight lines, and related to each other by V1=V2−Vo where Vo is a constant. However, nonlinear characteristic curves and other relationships may optionally be used as the characteristic curves.

In FIG. 5, the program first reads out the present value of the motor voltage Vm at a step 41, and then after finding the absolute value, Delta T, the program obtains the upper value V2 and the lower value V1 corresponding to Delta T at a step 42. Then, it is decided at a step 43 whether the present motor voltage Vm is equal to or smaller than the upper value V2, and if it is not, it is further decided whether V2 is equal to an upper limit value HI of Vm at a step 44. If V2=HI, Vm is set at HI at a step 46, and if V2≠HI, Vm is set at V2 at a step 45. Then, the program goes to step 51 where a voltage control command signal is delivered with the value of Vm decide at the step 45 or 46. On the other hand, if Vm is equal to or smaller than V2, the program goes from the step 43 to a step 47, where it is decided whether Vm is equal to or greater than the lower value V1. If it is, the program goes directly to the step 51, and if it is not, it is further decided at a step 48 whether V1 is equal to or smaller than LOW which is a lower limit value of Vm. If V1 is greater than LOW, Vm is set at V1 at a step 49, and if V1 is equal to or smaller than LOW, Vm is set at LOW at a step 50. Then, the program goes from the step 49 or 50 to the step 51.

Because the blower fan speed is thus controlled in accordance with the temperature difference between the reference temperature and the sensed room temperature and it is controlled independently of the opening degree of the air mixing door, the blower fan speed gradually decreases with an approach of the sensed room temperature to the reference temperature even in or near the full hot mode or the full cool mode, and does not remain at high speed for a long time. Therefore, according to the present invention, the blower fan noise is less troublesome. Furthermore, the present invention can remove the possibility that the blower fan fluctuates in its speed and presents undesirable howling.

What is claimed is:

1. An air quantity control system for an automobile air conditioner, comprising:
   an air conditioner comprising a blower fan driven by a motor and air temperature regulating means,
   a reference temperature supplier for supplying a predetermined reference temperature,
   a temperature sensor for sensing the temperature of the passenger compartment of the automobile, and
   blower fan speed control means connected with said reference temperature supplier and said temperature sensor for determining the speed of the blower fan and producing a control signal indicative of the determined fan speed, said control means being arranged to calculate the absolute value of the temperature difference between the reference temperature and the sensed temperature, and to determine, in accordance with the calculated absolute value, the value of a first function which increases as said absolute value increases and the value of a second function which increases as said absolute value increases and is always greater than the value of said first function, said control means determining the fan speed as being equal to the determined value of said second function if the current fan speed is greater than the determined value of said second function and as being equal to the determined value of said first function if the current fan speed is less than the determined value of said first function, while maintaining the current fan speed unchanged if the current fan speed is neither greater than the determined value of said second function nor less than the determined value of said first function, and
   blower fan speed regulating means, connected with said control means, for regulating the blower fan speed in accordance with said control signal.

2. An air quantity control system according to claim 1, wherein said fan speed determines means controls the fan speed in terms of the voltage Vm of the motor driving the blower fan.

3. An air quantity control system according to claim 2, wherein said second function is given by V2=aΔT+b, and said first function is given by V1=V2−Vo, where ΔT=the absolute value of the temperature difference between the reference temperature and the sensed temperature, a=a positive constant, b=a constant, and Vo=a positive constant.

4. An air quantity control system according to claim 2, wherein said first and second functions are nonlinear functions.

5. An air quantity control method for an automobile air conditioner, said method comprising:
   determining a reference temperature,
   sensing the temperature of a passenger compartment of the automobile,
   calculating the absolute value of the difference between the reference temperature and the sensed temperature of the passenger compartment, and
   determining, in accordance with the calculated absolute value, the value of a first function which increases as said absolute value increases and the value of a second function which increases as said absolute value increases and is always greater than the value of said first function,
   determining the fan speed as being equal to the determined value of said second function if the current fan speed is greater than the determined value of said second function and as being equal to the determined value of said first function if the current fan speed is less than the determined value of said first function while maintaining the current fan speed if the current fan speed is neither greater than the determined value of said second function nor less than the determined value of said first function, and regulating the blower fan speed in accordance with the determined blower fan speed.

6. An air quantity control method according to claim 5, wherein the step of determining fan speed includes the step of determining the voltage Vm of a motor driving the blower fan.

7. An air quantity control method according to claim 6, wherein said second function is determined by V2=aΔT+b, and said first function is given by V1=V2−Vo, where ΔT=said absolute value, a=a positive constant, b=a constant, and Vo=a positive constant.

8. An air quantity control method according to claim 6, wherein said first and second functions are determined as nonlinear functions.

9. An air quantity control method according to claim 5 comprising the further steps of setting upper and lower limits for said fan speed, determining whether the second or first functions are at said upper or lower limits, respectively, and setting the fan speed to the appropriate limit if one of said functions equals its respective limit.

10. An air quantity control system for an automobile air conditioner comprising:
an air conditioner comprising a blower fan driven by a motor and air temperature regulating means,
a reference temperature supplier for supplying a predetermined reference temperature,
a temperature sensor for sensing the temperature of the passenger compartment of the automobile, and
blower fan speed control means connected with said reference temperature supplier and said temperature sensor including converting means for coverting analog signals produced by said reference temperature supplier and by said temperature sensor to digital signals,
calculating means responsive to said digital signals representing said predetermined reference temperature and said passenger compartment temperature and to a signal representative of a current speed of said blower fan for calculating an absolute value of a difference between said reference temperature and said passenger compartment temperature, for calculating first and second functions of said absolute value of temperature difference, said first function being lower than said second function, and for generating a new value for a control signal for said blower fan motor to set a new fan speed by performing the sequence of
determining whether said current blower fan speed exceeds said second function,
if so, setting the new value of said control signal, and thus the corresponding new value of fan speed, to the calculated value of said second function;
determining whether said current blower fan speed is lower than said first function;
if the second recited determination is affirmative, setting the new value of said control signal, and thus the corresponding new value of fan speed, to the calculated value of said first function;
if the second recited determination is negative, setting the new value of said control signal, and thus the corresponding new value of fan speed, to maintain the current value of said control signal, thereby to maintain the current speed of said blower fan; and
motor driving means responsive to said control signal output by said calculating means for controlling said blower fan motor to drive said blower fan at said new fan speed.

11. An air quantity control system according to claim 10 wherein said calculating means is further operable subsequent to affirmative results of said first and second recited determining operations, respectively, for setting upper and lower operating speed limits for said blower fan by respectively determining whether said calculated second or first functions equal the limits therefor and, if the determination is affirmative, setting the new value of said control signal, and thus the corresponding new value of fan speed, to said upper or lower limit therefor, respectively.

* * * * *